United States Patent
Kato et al.

(10) Patent No.: US 9,341,757 B2
(45) Date of Patent: May 17, 2016

(54) OPTICAL COMPONENT INCLUDING INTERFERENCE FILTER

(71) Applicant: FDK CORPORATION, Tokyo (JP)

(72) Inventors: Takashi Kato, Tokyo (JP); Tomoaki Kiriyama, Tokyo (JP)

(73) Assignee: Kohoku Kogyo Co., Ltd., Nagahama-shi (JP)

( * ) Notice: Subject to any disclaimer, the term of this patent is extended or adjusted under 35 U.S.C. 154(b) by 72 days.

(21) Appl. No.: 14/359,643

(22) PCT Filed: Oct. 30, 2012

(86) PCT No.: PCT/JP2012/077983
§ 371 (c)(1),
(2) Date: May 21, 2014

(87) PCT Pub. No.: WO2013/077146
PCT Pub. Date: May 30, 2013

(65) Prior Publication Data
US 2014/0334776 A1    Nov. 13, 2014

(30) Foreign Application Priority Data

Nov. 25, 2011    (JP) .................................. 2011-257989

(51) Int. Cl.
*G02B 5/28*    (2006.01)
*G02B 6/28*    (2006.01)
*G02B 6/293*    (2006.01)

(52) U.S. Cl.
CPC ................ *G02B 5/28* (2013.01); *G02B 6/2937* (2013.01)

(58) Field of Classification Search
CPC ................................ G02B 6/2937; G02B 5/28
See application file for complete search history.

(56) References Cited

U.S. PATENT DOCUMENTS 5,608,743 A * 3/1997 Hayakawa ............. H01S 5/141
372/19
2003/0156799 A1    8/2003 Wada et al.
(Continued)

FOREIGN PATENT DOCUMENTS

JP    03-037603    2/1991
JP    08-320425    12/1996
(Continued)

OTHER PUBLICATIONS

Int'l. Search Report issued in Int'l. App. No. PCT/JP2012/077983, mailed Dec. 4, 2012.
(Continued)

*Primary Examiner* — Jerry Rahll
(74) *Attorney, Agent, or Firm* — Greer Burns & Crain Ltd.

(57) ABSTRACT

An optical component including an interference filter which is less likely to generate back reflected light, where the filter is accommodated in a hollow cylindrical housing and is tilted with respect to the optical axis. The housing has front and back openings. First and second collimator lenses respectively face the front and back openings. The housing includes a filter housing section and first and second cylindrical optical path sections extending in the front-back direction respectively from the front and back openings to the filter housing section while maintaining the shape of each opening. The diameter of the opening of the first optical path section is smaller than the apparent diameter of the first collimator lens. When light is input from the front along the optical axis, light of prescribed wavelengths is output to the back. Light reflected by the filter travels toward the inside of the first optical path section.

4 Claims, 6 Drawing Sheets

FRONT ←——————→ BACK

(56) References Cited

U.S. PATENT DOCUMENTS

| | | |
|---|---|---|
| 2007/0047873 A1 | 3/2007 | Okada |
| 2010/0238559 A1 | 9/2010 | Tanaka |

FOREIGN PATENT DOCUMENTS

| | | |
|---|---|---|
| JP | 09-258064 | 10/1997 |
| JP | 2002-182068 | 6/2002 |
| JP | 2002-182068 A | 6/2002 |
| JP | 2003-205447 | 7/2003 |
| JP | 2003-322755 | 11/2003 |
| JP | 2007-017903 | 1/2007 |
| JP | 2007-057859 | 3/2007 |
| JP | 2007-086757 | 4/2007 |
| JP | 2009-020540 | 1/2009 |
| JP | 2009-145427 | 7/2009 |

OTHER PUBLICATIONS

Mathias Lischke et al.; Agilent Technologies, Inc.; "Return Loss Solutions with the Agilent 8161X Return Loss Modules"; [online] [searched on Nov. 4, 2011] published Oct. 30, 2001; pp. 1-12; Internet <URL: http://www.home.agilent.com/upload/cmc_upload/A11/5988-3435JA.pdf?&cc=JP&1c=jpn>.

Japanese Office Action issued in Japanese App. No. 2011-257989, dated Sep. 9, 2015 (with translation).

Decision to Grant issued in Japanese App. No. 2011-257989, dated Nov. 26, 2015 (with translation).

* cited by examiner

OPTICAL COMPONENT INCLUDING INTERFERENCE FILTER

This is a National Phase Application filed under 35 U.S.C.§371, of International Application No. PCT/JP2012/077983, filed Oct. 30, 2012.

TECHNICAL FIELD

The present invention relates to an optical component including an interference filter. More particularly, the present invention relates to a countermeasure technology against stray light in an optical component including an interference filter.

BACKGROUND ART

Figure 1A:
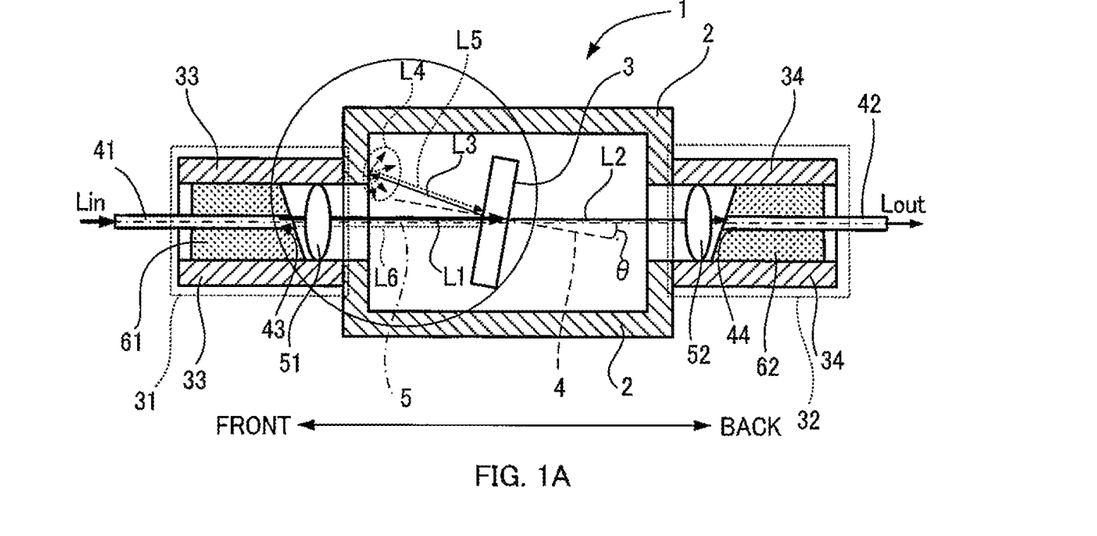
FIG. 1A is a drawing which shows the structure and condition of an optical component.
Figure 1B:
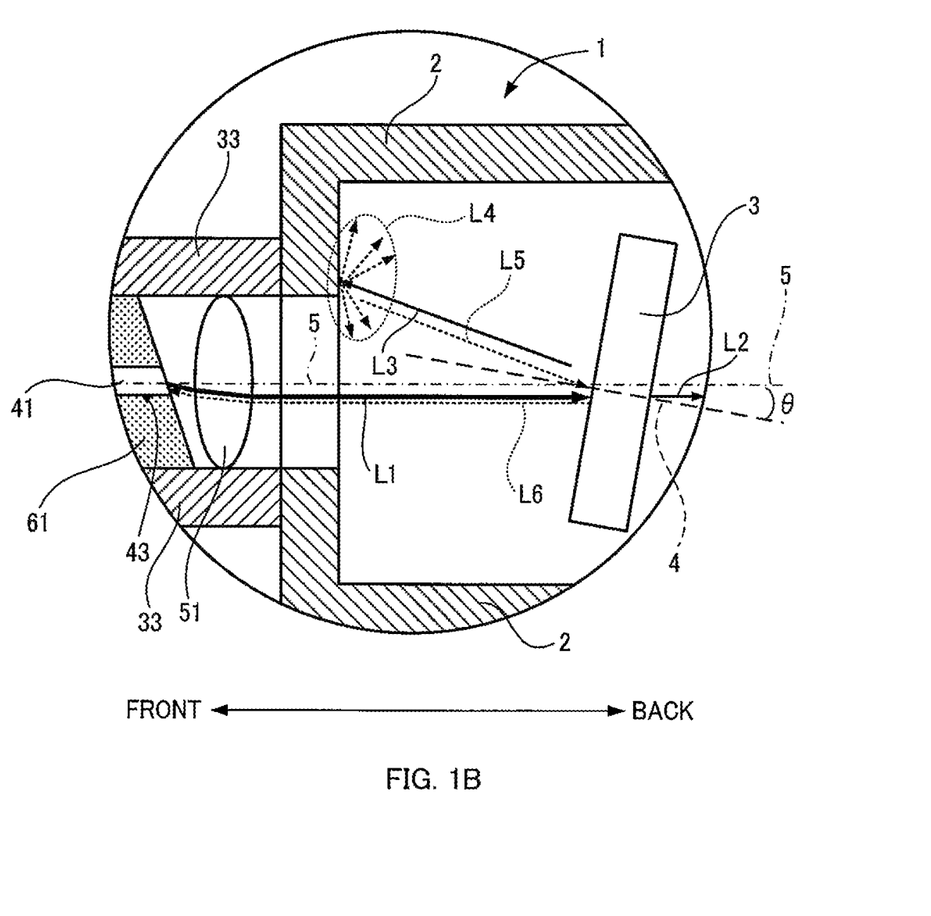
FIG. 1B is a drawing which shows the structure and state of the optical component.

An interference filter, in which a dielectric thin film is formed on a glass substrate, transmits light of a specific wavelength band and reflects light of other wavelength bands. Such an interference filter is, for example, incorporated into an optical component constituting an optical communication system and used for separating light into light of wavelengths required for optical communication and light of other wavelengths (such as noise). FIGS. 1A and 1B show the structure of an optical component 1 including an interference filter 3. FIG. 1A is a cross-sectional view of the optical component 1 taken along a plane including an optical axis 5 and FIG. 1B is an enlarged view of the circle shown in FIG. 1A. In this optical component 1, two optical fibers (41, 42), which are retained by respective ferrules (61, 62), are arranged on the optical axis 5 in such a manner that opening ends (43, 44) face with each other. An optical path is formed between these opposing opening ends (43, 44). Further, the optical component 1 has a configuration in which light Lin (incident light Lin) entering the optical fiber 41 on one side is emitted as output light Lout from the optical fiber 42 on the other side.

Where a direction in which the optical axis 5 extends is defined as the front-back direction, the interference filter 3 is arranged near the center between the opening ends (43, 44) of the front and back optical fibers (41, 42) and collimator lenses (51, 52) are respectively arranged before and after the interference filter 3. Further, in the illustrated optical component 1, collimators (33, 34) are each connected to the front and back of a housing 2 which accommodates the interference filter 3, the collimators (33, 34) respectively including housings (31, 32) which respectively accommodate the ferrules (61, 52) retaining the optical fibers (41, 42) and the collimator lenses (51, 52).

The operation of the optical component 1 will be described below referring to FIGS. 1A and 1B. In these figures, in order to be able to easily distinguish the forward path and the return path, only one of these optical paths that are symmetrical about the optical axis 5 is shown; the forward path is an optical path directed from the input-side optical fiber 41 toward the interference filter 3 and the return path is an optical path directed from the interference filter 3 toward the input-side optical fiber 41. In the optical component 1, the input light Lin from a light source first enters the input-side (front) optical fiber 41. The input light Lin is emitted from the opening end (back end) 43 of the same optical fiber 41, and this emitted light subsequently enters the interference filter 3, as parallel beams L1, through the front collimator lens 51. Only part of the incoming light L1 that has a specific wavelength band is transmitted backward through the interference filter 3. The transmitted light L2 couples to the opening end (front end) 44 of the output-side (back) optical fiber 42 through the back collimator lens 52. Meanwhile, light L3 which is not transmitted through the interference filter 3 is reflected. It should be noted that the illustrated optical component 1 has a straight optical path extending from the input side to the output side of light. So, in order to prevent the light L3 reflected by the interference filter 3 from directly entering to the input-side collimator lens 51 and coupling to the input-side optical fiber 41, the tilt angle θ between the optical axis 5 and the normal line 4 of the light incident plane of the interference filter 3 is about 2° to 5°. Thereby, the light L3 reflected by the interference filter 3 is absorbed by the inner surface of the housing 2.

Incidentally, the light L3 reflected by the interference filter 3 is directed to the inner surface of the housing 2; however, this reflected light L3 is not completely absorbed by the inner surface of the housing 2 and a part thereof is reflected by the inner surface of the housing 2. In addition, since the inner surface of the housing 2 is not a specular surface, the light L3 reflected by the interference filter 3 is not specularly reflected by the inner surface of the housing 2 and is scattered as illustrated. Consequently, the scattered lights L4 are further repeatedly reflected and scattered by the inner surface of the housing 2; that is, so-called "stray light" is generated. The stray light eventually disappears because most of the energy of the stray light is absorbed and converted to heat when the stray light is scattered at the inner surface of the housing 2. However, light L5, which is a part of the light L4 generated when the light L3 reflected by the interference filter 3 is initially scattered at the inner surface housing 2, may travel back exactly the same optical path as that of the light L3 reflected by the interference filter 3. In this case, the light L5 of the scattered lights L4 returns the path to the interference filter 3 traversed by the emitted light L1 from the input-side optical fiber 41. Thus, the light L5 becomes "back reflected light" L6 which re-couples to the input-side optical fiber 41.

There is a possibility that this back reflected light L6 then propagates toward the light source through the input-side optical fiber 41 and reach the light source. In optical communication, a semiconductor laser element is used as a light source. Such optical feedback into the light-emitting section of a semiconductor laser causes the change of the oscillation characteristics of the semiconductor laser. This makes the output of the laser unstable, which results in deterioration in the quality of optical communication. An index of the degree of this deterioration is known as "return loss" and a method of measuring it is described in Non-Patent Literature 1 listed below and the like.

The Patent Literatures 1 to 3 listed below describe countermeasures against stray light in optical components. The Patent Literature 1 describes the invention using the following countermeasure to prevent a part of light reflected by an interference filter from entering a light-receiving element arranged on the light output-side, which causes crosstalk. That is, the housing of the invention has a conical hole whose opening size is larger than the spread of the light reflected by the interference filter and gradually reduced in the depth direction; this allows the inner surface of the conical hole to reflect the reflected light and to prevent the reflected light from traveling on the optical path to the light-receiving element.

Patent Literatures 2 and 3 describe optical components in which a material for absorbing stray light is used in the inner surface of the housing.

CITATION LIST

Patent Literature

[PTL 1] Japanese Laid-open Patent Application (Kokai) No. 2007-57859
[PTL 2] Japanese Laid-open Patent Application (Kokai) No. 2009-20540
[PTL 3] Japanese Laid-open Patent Application (Kokai) No. 2007-17903

Non Patent Literature

[NPL 1] Agilent Technologies, Inc., "Return Loss Solutions with the Agilent 8161X Return Loss Modules", [online], [searched on Nov. 4, 2011], Internet <URL: http://www.home.agilent.com/upload/cmc_upload/All/5988-3435JA.pdf?&cc=JP&lc=jpn>

SUMMARY OF THE INVENTION

Technical Problem

In those optical components disclosed in the Patent Literatures 1 to 3, as a countermeasure against stray light, the inner surface of a housing which accommodates an interference filter is processed by means such as coating with a light-absorbing material, punching a conical hole thereon, or the like. This increases the production cost. In addition, in such cases where the housing of the optical component is integrally molded by means such as injection molding or the like, complex techniques will be needed for coating the inner surface of the housing with a light-absorbing material or for punching a conical hole.

Thus, an aspect of the invention is to provide an inexpensive optical component including an interference filter which is less likely to generate back reflected light.

Solution to Problem

In order to achieve the above-described object, the present invention provides: An optical component, including:
a hollow cylindrical housing including:
openings at both front and back ends where a direction in which an optical axis extends is defined as a front-back direction,
a filter housing section provided inside of the housing; and
first and second cylindrical optical path sections
that are provided inside of the housing, and
that extend in the front-back direction respectively from the front and back openings to the filter housing section while maintaining the shape of each opening;
a diameter of the opening of the first optical path section being smaller than an apparent diameter of a following first collimator lens when viewed from the front,
an interference filter
that is accommodated in the filter housing section and is tilted with respect to the optical axis; and
first and second collimator lenses
that are arranged respectively before and after the interference filter, and
that respectively face the front and back openings of the housing,
wherein
when light is input from the front along the optical axis, light of prescribed wavelengths is output to the back.

Further, in such an optical component, a diameter of the opening of the second optical path section may be smaller than an apparent diameter of the second collimator lens when viewed from the back, and when light is input from the back along the optical axis, light of prescribed wavelengths may be output to the front.

The shape of the filter housing section may be formed so that a direction in which input light is reflected by the interference filter is toward the inside of the optical path section.

The scope of the invention includes an optical component including the interference filter, wherein a first optical-fiber collimator and a second optical-fiber collimator are respectively connected to the front and back ends of the housing, the first optical-fiber collimator including an optical fiber retained by a ferrule and the first collimator lens, the second optical-fiber collimator including a second optical fiber retained by a ferrule and the second collimator lens. More preferably, the ferrules are made of a transparent glass.

Effects of the Invention

According to the present invention, an optical component including an inexpensive interference filter which is less likely to generate back reflected light can be provided.

MODE FOR CARRYING OUT THE INVENTION

===Structure and Basic Operation of Optical Component===

Figure 2A:
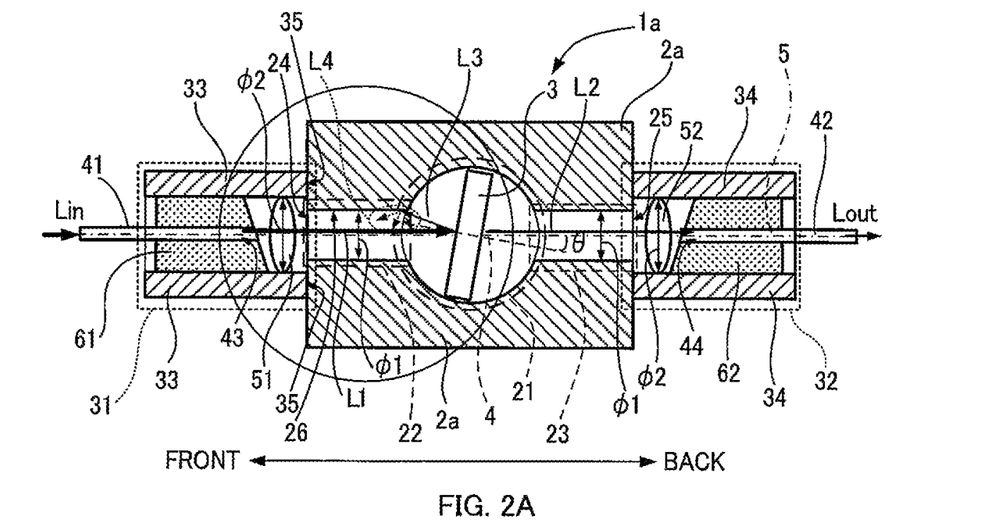
FIG. 2A is a drawing which shows a structure and condition of an optical component according to an embodiment of the present invention.
Figure 2B:
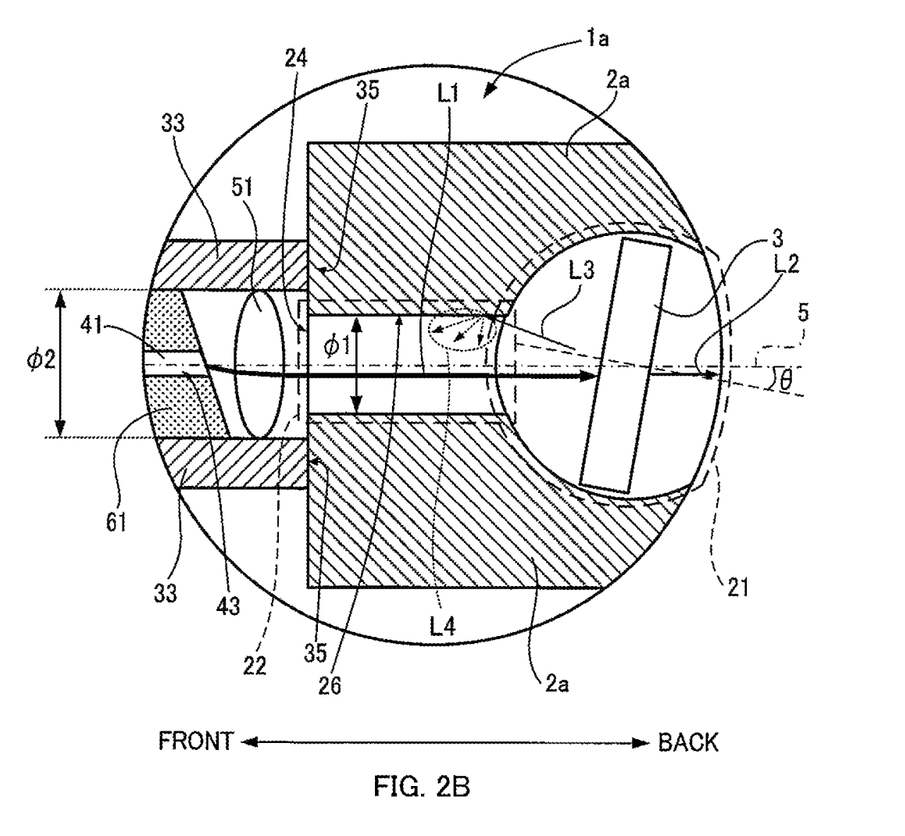
FIG. 2B is a drawing which shows the structure and condition of the optical component according to the embodiment of the present invention.

FIGS. 2A and 2B show the structure of an optical component 1a according to one embodiment of the present invention. FIG. 2A is a cross-sectional view of the optical component 1a taken along a plane including an optical axis 5 and FIG. 2B is an enlarged view of the circle shown in FIG. 2A. In the same manner as in the optical component 1 shown in FIGS. 1A and 1B, the optical component 1a according to this embodiment has the following structure: two optical fibers (41, 42) are respectively retained by ferrules (61, 62); the optical fibers (41, 42) are arranged on the optical axis 5 in such a manner that the opening ends (43, 44) face with each other; and an optical path is formed between these opposing opening ends (43, 44). Further, light Lin (incident light Lin) entering the optical fiber 41 on one side is emitted as output light Lout from the optical fiber 42 on the other side. It is noted that, for the purposes of promoting an understanding of forward and return optical paths, only one of these optical paths is shown with respect to the optical axis 5 in these figures.

Where a direction in which the optical axis 5 extends is defined as the front-back direction, the optical component 1a has a basic structure in which the interference filter 3 is arranged near the center between the opening ends (43, 44) of the front and back optical fibers (41, 42) and collimator lenses (51, 52) are respectively arranged before and after the interference filter 3. In the illustrated optical component 1a.collimators (33, 34) are each connected to the front and back of a housing 2a (hereinafter referred to as "filter case 2a") which accommodates the interference filter 3, the collimators (33, 34) respectively including housings (31, 32) which respectively accommodate the ferrules (61, 62) retaining the optical fibers (41, 42) and the collimator lenses (51, 52). The above-described configuration, structure and operation are the same as those of the conventional embodiment shown in FIGS. 1A and 1B. However, the optical component 1a according to the present embodiment has characteristic features in the following points: the structure of the housing 2a (hereinafter referred to as "filter case 2a") which accommodates the interference filter 3; and a dimensional relationship between the internal structure of the filter case 2a and the apparent diameter φ2 of the collimator lenses (51, 52). The optical component 1a is thus capable of inhibiting generation of back reflected light caused by stray light. The configuration and structure of the optical component 1a according to the present embodiment will be described below more specifically.

The filter case 2a has a cylindrical appearance. The filter case 2a includes circular openings (24, 25) at both ends of the cylinder and is a hollow cylinder so that the openings (24, 25) at both ends are communicated. This hollow part includes a filter housing section 21 and optical path sections (22, 23); the filter housing section 21 is a space for housing the interference filter 3 and the optical path sections (22, 23) connect the filter housing section 21 respectively to the front and back openings (24, 25). The optical path sections (22, 23) are both in the form of a cylinder having a circular cross-section and extend to the openings (24, 25) while maintaining the diameter φ1 of the circular cross-section uniform. Further, in the present embodiment, the filter housing section 21 is also in the form of a cylinder having a diameter larger than those of the optical path sections (22, 23).

To the front and back of the filter case 2a, the collimators (31, 32) are connected respectively. In the collimators (31, 32), the collimator lenses (51, 52) are respectively housed in the hollow cylindrical housings (33, 34) (hereinafter referred to as "lens barrels (33, 34)"). Each of the front and back lens barrels (33, 34) has circular openings at both front and back ends thereof. Each of the collimator lenses (51, 52) is arranged near the respective opening on the side connected to the filter case 2a. The diameter φ2 of the collimator lenses (51, 52) is substantially the same as the opening diameter of the lens barrels (33, 34); this opening diameter is defined as the apparent diameter φ2 of the collimator lens. Further, to the other opening of each of the lens barrels (33, 34), that is, to the opening on the outer side with respect to the filter case 2a, inserted is each of the ferrules (61, 62) which retain the optical fibers (41, 42) respectively. Moreover, as viewed from both the front and back ends of the optical component 1a.the openings (24, 25) of the optical path sections (22, 23) of the filter case 2a have a smaller diameter than the apparent diameter φ2 of the collimator lenses (51, 52). That is, not only is the opening diameter φ1 of the filter case 2a smaller than the apparent diameter φ2 of the collimator lenses (51, 52) but, as viewed from both the front and back ends of the optical component 1a.the areas where the lenses (51, 52) exist cover the areas where the openings (24, 25). The operation of the optical component 1a having the above-described configuration and structure and countermeasures against stray light implemented therein will be described below.

===Countermeasure against Stray Light===

Figure 3:
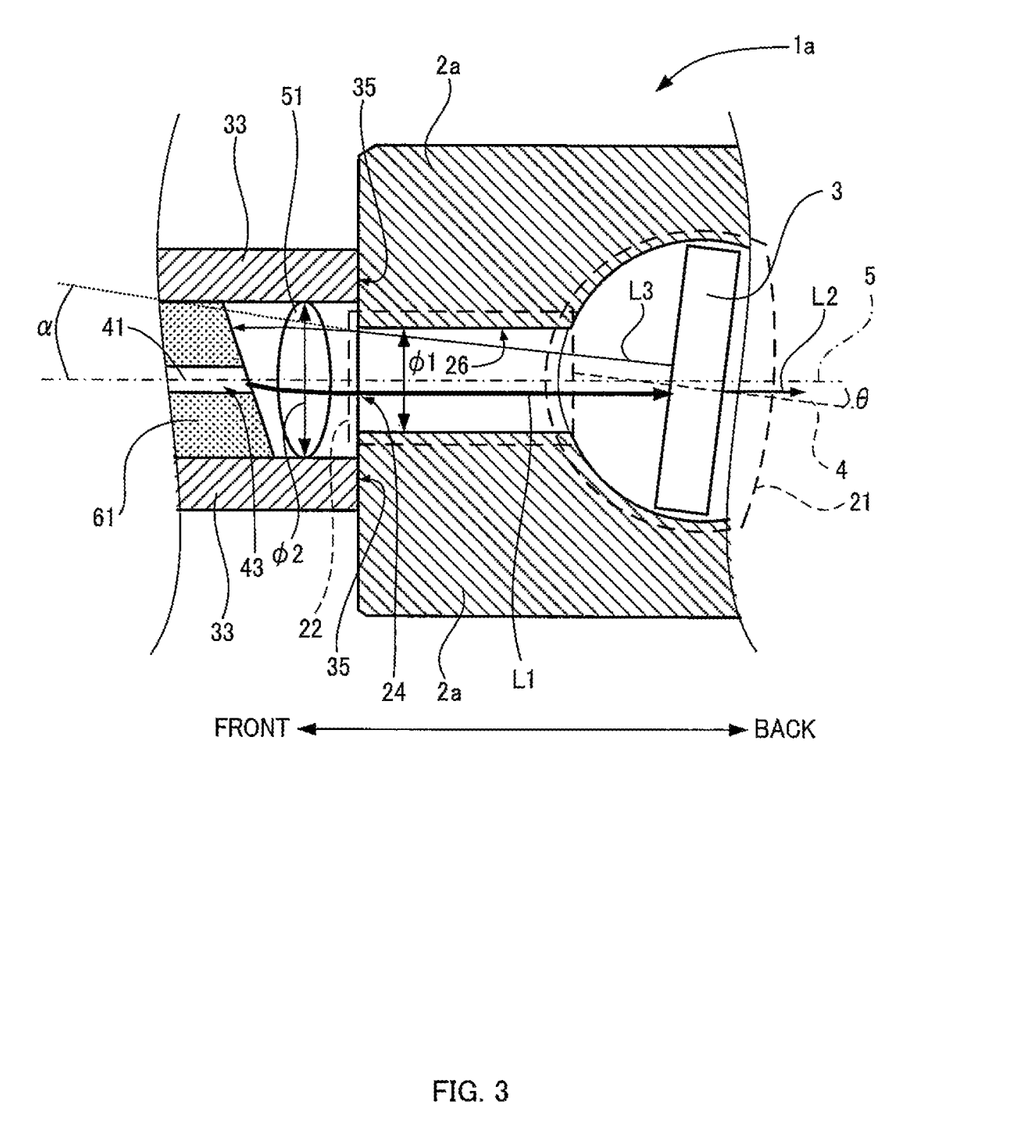
FIG. 3 is a drawing which shows another condition of the optical component according to the embodiment.

As described above, the optical component 1a according to the present embodiment is characterized in that, in the optical path along the optical axis 5, the opening diameter φ1 of the optical path sections (22, 23) is smaller than the apparent diameter φ2 of the collimator lenses (51, 52). FIGS. 2B and 3 show the overview of the operation of the optical component 1a according to the present embodiment. The optical component 1a according to the present embodiment is reciprocal and a light input from either one of the front and back ends is output to the other side of the back and front side. The operation of the optical component 1a and the countermeasures thereof against stray light will be descried below concerning the optical path on the front side of the interference filter 3.

First, as shown in FIG. 2B, suppose that the interference filter 3 reflects a light L3 having a prescribed wavelength band and included in a light L1 entering the interference filter 3 from the front side and that the thus reflected light L3 is scattered at the inner surface 26 of the front-side optical path section 22. In this case, the component of the travelling direction of the reflected light L3 is directed forward, and the inner surface 26 of the optical path section 22 extends in the front-back direction. Thus, concerning most of the lights L4 scattered by the inner surface 26, the components thereof are directed forward. In other words, concerning few of the scattered lights L4, the components thereof are directed backward, that is, toward the side of the interference filter 3. Thus, none of the scattered lights L3 is reflected by the interference filter 3 and travels forward again. Accordingly, it can be said that very few of the scattered lights L4 in the optical path section 22 travel back the optical path of the reflected light L3. Moreover, since the opening diameter φ1 of the optical path section 22 is smaller than the apparent diameter φ2 of the collimator lens 51, none of the scattered lights L4 is reflected by the back-end surface 35 of the lens barrel 33. Therefore, regardless of the path, there is no light traveling back the optical path of the reflected light L3, so that no back reflected light (FIGS. 1A and 1B: L6) is generated in the optical component 1a according to the present embodiment.

Incidentally, the intersection angle θ (tilt angle θ) between the normal line 4 of the interference filter 3 and the optical axis 5 is usually about 2° to 5°.The surface of the interference filter 3 which light enters is nearly perpendicular to the optical axis 5. Therefore, as shown in FIG. 3, when the tilt angle e of the interference filter 3 is small, there is a possibility that the light L3 reflected by the interference filter 3 is directly emitted to the front side from the opening 24 of the optical path section 22 without being scattered at the inner surface 26 of the optical path section 22. In this case, the reflected light L3 directly emitted to the front side from the opening 24 of the optical path section 22 subsequently enters the collimator lens 51. However, this light L3 reflected by the interference filter 3 enters the periphery of the collimator lens 51 because the opening diameter φ1 of the optical path section 22 is smaller than the apparent diameter φ2 of the collimator lens 51 and because the reflected light L3 is thus tilted at a large angle of α with respect to the optical axis 5. Consequently, even if the reflected light L3 is refracted by the collimator lens 51, the refracted light does not couple to the opening end 43 of the optical fiber 41. Therefore, no back reflected light is generated.

Figure 4:
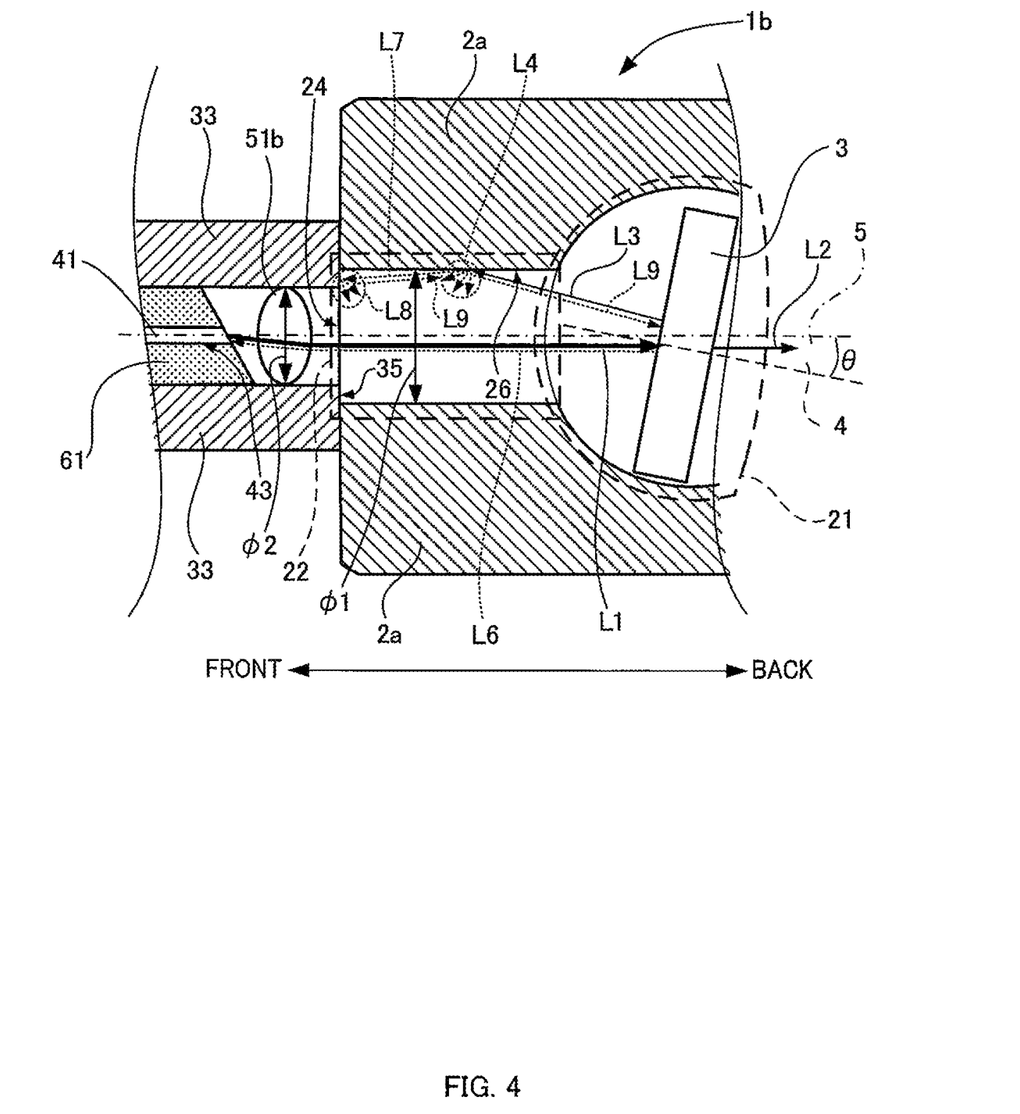
FIG. 4 is a drawing which shows the structure and operation of an optical component according to a comparative embodiment.

Here, as a comparative embodiment against the present embodiment, FIG. 4 shows an optical component 1b in which the apparent diameter φ2 of the collimator lens 51 is smaller than the opening diameter φ1 of the optical path section 22. The reflected light L3 is scattered by colliding with the inner surface 26 of the optical path section 22, and a light L7 of the scattered lights L4 is scattered by colliding with the back-end surface 35 of the lens barrel 33. There is a possibility that a light L9 of lights L8 scattered by the back-end surface 35 travels back the optical path of the light L3 reflected by the interference filter 3. That is, there is a possibility that a back reflected light L6 is generated.

Here, in the optical component 1b according to this comparative embodiment, suppose that the tilt angle θ of the interference filter 3 is further smaller so that the reflected light 3 directly enters the collimator lens 51. In this case, the light L3 reflected by the interference filter 3 enters near the center of the collimator lens 51; therefore, it is highly probable that this reflected light L3 directly couples to the optical fiber 41, as in the case of the optical component 1.

===Return Loss Characteristics===

Above described are the countermeasures against stray light implemented in the optical component 1a of the present embodiment and the mechanism in which generation of back reflected light can be inhibited by the countermeasures. Next, preparing the optical component 1a of the present embodiment and the optical component 1 shown in FIGS. 1A and 1B, measured was a return loss which is a ratio between the intensity of light entering the optical fibers (41, 42) and that of light returning back to the side of the light input end.

Figure 5A:
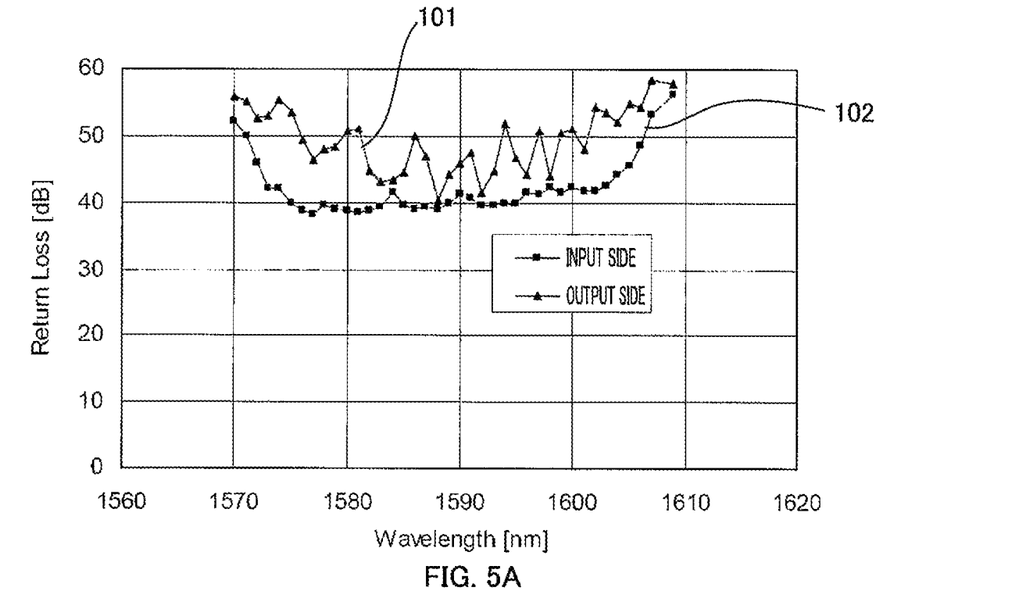
FIG. 5A is a graph showing the return loss characteristics of an optical component.
Figure 5B:
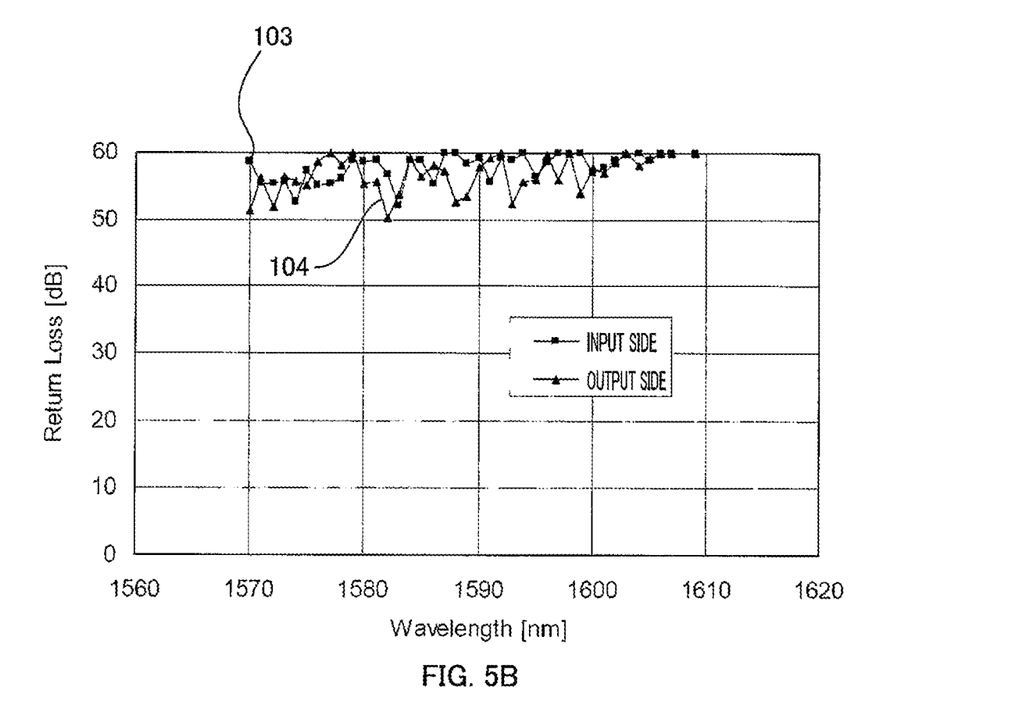
FIG. 5B is a graph showing the return loss characteristics of another optical component.

FIGS. 5A and 5B are graphs showing the wavelength dependency of the return loss in the optical component 1 shown in FIGS. 1A and 1B and in the optical component 1a of the present embodiment shown in FIGS. 2A, 2B and 3. The optical component 1 and the optical component 1a of the present embodiment are both reciprocal. That is, a light input from either one of the front and back sides transmits through the interference filter 3 and exits to the other side as light of a prescribed wavelength band. Thus, in FIGS. 5A and 5B, the return loss characteristics for the light input from the front side is indicated as an "input side", and that for the light input from the back side is indicated as an "output side".

First, as shown in FIG. 5A, in the optical component 1, the input-side characteristic 101 show a great wavelength dependence, and the return loss varies greatly depending on the wavelength. In addition, the return loss is small in the range of 40 db to 50 db almost over the entire transmission wavelength range. While the output-side characteristic 102 does not show such great wavelength dependence, the return loss is mostly about 40 db. It is thus seen that a large amount of back reflected light was generated. The reasons why the input-side and output-side characteristics (101, 102) are asymmetrical are considered as follows: the interference filter 3 in which an interference film made of a dielectric thin film is formed on one side of a glass substrate has asymmetric reflection characteristics between light entering from the glass surface side and light entering from the interference film side; the straight line connecting the opening ends (43, 44) of the opposing optical fibers (41, 42) is not aligned with the optical axis 5; and the like. In both cases, the return losses are not large. In addition, even if the input-side and output-side characteristics (101, 102) were symmetrical, only average return loss characteristic would be obtained for both the input and output sides. That is, there is no doubt that, in the optical component 1, large return loss cannot be attained and the return loss characteristics show great wavelength dependence. Therefore, in the optical component 1, it is required to arrange some other optical component (a light isolator) on the optical path between the light source and the interference filter 3 so as to prevent the back reflected light from reaching the light source. Thus, considering the overall configuration of an optical communication system including this optical component 1, it is difficult to achieve cost reduction.

On the other hand, in the optical component 1a of the present embodiment shown in FIG. 5B, both of the input-side and output-side characteristics (103, 104) showed a return loss of not less than 50 db up to 60 db in the measurement wavelength range. Here, a light intensity-measuring apparatus (an optical power meter) has a measurement limit, and the upper limit of the return loss based on this measurement limit is 60 db or so. Therefore, from the characteristics (103, 104) shown in FIG. 5B, it can be said that, in the optical component 1a of the present embodiment, the intensity of the back reflected light was less than the measurement limit and generation of back reflected light was almost completely inhibited. Furthermore, the wavelength dependence was low and the input-side and output-side characteristics (103, 104) were substantially symmetrical.

===Other Embodiments===

<Configuration of Optical Component>

In the optical component 1a of the above-described embodiment, the collimators (31, 32) including the ferrules (61, 62) and the collimator lenses (51, 52) are connected to the filter case 2a. However, the invention is not limited thereto. It is sufficient that the collimator lenses (51, 52) are arranged so as to face respectively the openings (24, 25) of the optical path sections (22, 23) arranged in the filter case. For example, an optical component may be constituted by fixing two front and back collimator lenses (51, 52) and the filter case 2a on a laboratory bench for optical experiments.

<Reciprocity>

The optical component 1a of the above-described embodiment is reciprocal, and light can be input from either of the front and back sides. Thus, when the optical component 1a is viewed from either of the front and back sides, the opening diameter φ1 of the optical path sections (22, 23) is smaller than the apparent diameter φ2 of the collimator lenses (51, 52). Needless to say, if either one of the front and back sides is defined as the input side, it is sufficient that the opening diameter φ1 of the optical path section (22 or 23) is smaller than the apparent diameter φ2 of the collimator lens (51 or 52) at least when viewed from the input-side.

<Shape of Filter Housing Section>

Figure 6:
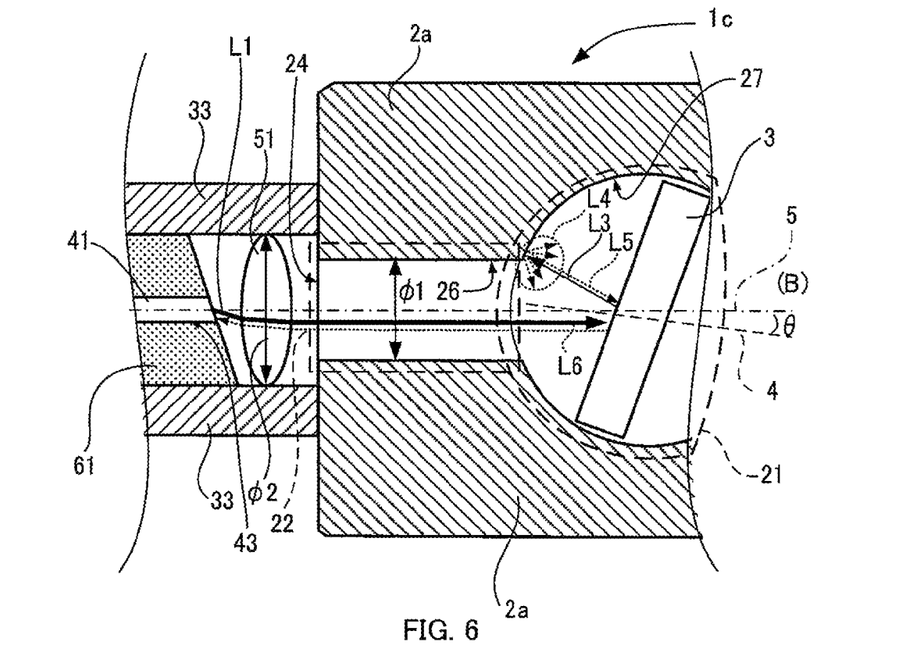
FIG. 6 is a drawing which shows the relationship between the tilt angle and condition of the interference filter included in the optical component of the embodiment.
Figure 7:
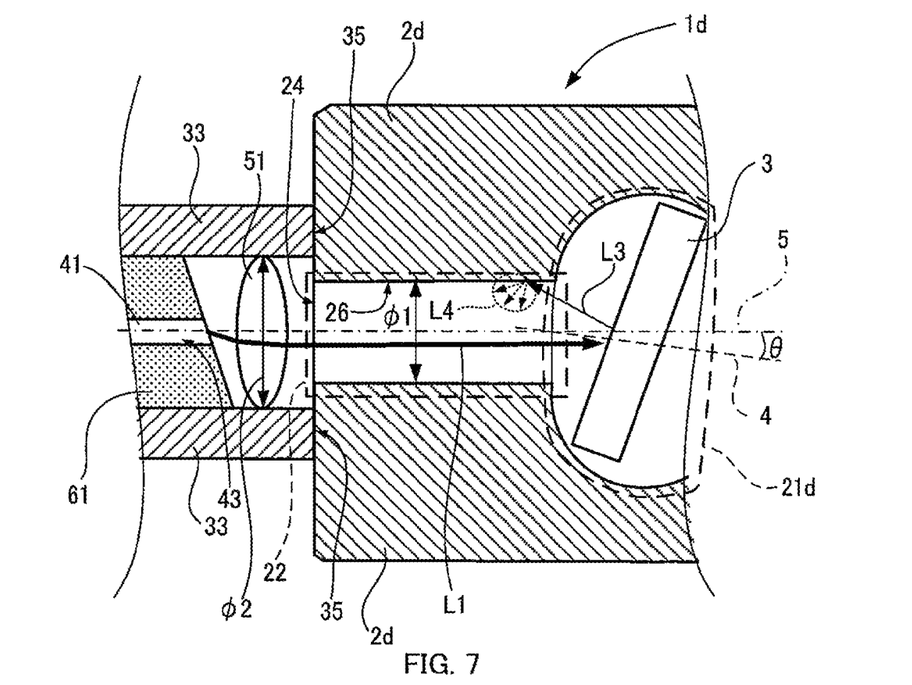
FIG. 7 is a drawing which shows the structure and condition of an optical component according to another embodiment of the present invention.

In the optical component 1a of the above-described embodiment, the filter housing section 21 had a cylindrical shape. However, when the angle θ between the normal line 4 of the interference filter 3 and the optical axis 5 is large as in the case of the optical component 1c shown in FIG. 6, there is a possibility that the light L3 reflected by the interference filter 3 is scattered on the inner surface 27 of the filter housing section 21 and the light L5 of the scattered lights L4 become the back reflected light L6 by being reflected by the interference filter 3. Therefore, as in the case of the optical component 1d shown in FIG. 7, the shape of the filter housing section 21d in the filter case 2d may be modified so that the reflected light L3 is always guided into the optical path 22 in accordance with the angle at which the interference filter 3 is installed. In the present embodiment shown in the figure, the filter housing section 21*d* is in the form of an ellipsoid whose shorter axis is in the front-back direction. Here, as is well known, when the angle e between the normal line 4 of the interference filter 3 and the optical axis 5 is excessively large, the properties of the interference filter 3 are consequently deteriorated because the angle at which the light L1 enters the interference film of the interference filter 3 is increased. Therefore, the interference filter 3 is usually inclined at an angle nearly perpendicular to the optical axis 5. Accordingly, it can be said that it is not so necessary to take into consideration the generation of back reflected light caused by a large installation angle of the interference filter 3.

<Material of Ferrule>

In the optical component 1*a* of the present embodiment, the back reflected light resulting from the light L3 reflected by the interference filter 3 can be almost completely eliminated. But, light emitted from the optical fibers (41, 42) slightly spreads even in a case of a highly linear laser beam. Thus, this light collides into the ferrules (61, 62) in the vicinity of the opening ends of the optical fibers (41, 42). The ferrules (61, 62) are mostly made of a white material, that is, a light-scattering material, such as zirconia. So, there is a possibility that light colliding with these ferrules (61, 62) is scattered and that a part of the scattered lights become back reflected light. Therefore, it is expected that employing a transparent glass as the material of the ferrules (61, 62) can prevent the generation of back reflected light attributed to the light-scattering property of the ferrules (61, 62) and can further increase the return loss.

INDUSTRIAL APPLICABILITY

The present invention is applicable to optical communication technologies.

REFERENCE SIGNS LIST

1, 1*a* to 1*d*: optical component
2, 2*a*, 2*d*: filter case
3: interference filter
4: normal line of the interference filter
5: optical axis
21: filter housing section
22, 23: optical path section
24, 25: opening of the optical path section (filter case)
26: inner surface of the optical path section
27: inner surface of the filter housing section
31, 32: collimator
33, 34: lens barrel
41, 42: optical fiber
51, 52: collimator lens
61, 62: ferrule
101, 102: return loss characteristics of a conventional optical component
103, 104: return loss characteristics of the optical component according to the present embodiment
L1: light entering to the interference filter
L2: light transmitted through the interference filter
L3: light reflected by the interference filter
L4, L5, L7, L8, L9: scattered lights
L6: back reflected light
θ: tilt angle of the normal line of the interference filter with respect to the optical axis
φ1: opening diameter of the optical path section
φ2: apparent diameter of the collimator lens

The invention claimed is:

1. An optical component, comprising:
a hollow cylindrical housing including:
openings at both front and back ends where a direction in which an optical axis extends is defined as a front-back direction,
a filter housing section provided inside of the housing; and
first and second cylindrical optical path sections
that are provided inside of the housing, and
that extend in the front-back direction respectively from the front and back openings to the filter housing section while maintaining the shape of each opening;
a diameter of the opening of the first optical path section being smaller than an apparent diameter of a following first collimator lens when viewed from the front,
an interference filter
that is accommodated in the filter housing section and is tilted with respect to the optical axis; and
first and second collimator lenses
that are arranged respectively before and after the interference filter, and
that respectively face the front and back openings of the housing, wherein
when light is input from the front along the optical axis, light of prescribed wavelengths is output to the back, and
a shape of the filter housing section is formed so that a direction in which input light is reflected by the interference filter is toward an inside of the optical path section.

2. An optical component including the interference filter according to claim 1, wherein
a diameter of the opening of the second optical path section is smaller than an apparent diameter of the second collimator lens when viewed from the back, and
when light is input from the back along the optical axis, light of prescribed wavelengths is output to the front.

3. An optical component including the interference filter according to claim 1, wherein
a first optical-fiber collimator and a second optical-fiber collimator are respectively connected to the front and back ends of the housing,
the first optical-fiber collimator including an optical fiber retained by a ferrule and the first collimator lens,
the second optical-fiber collimator including a second optical fiber retained by a ferrule and the second collimator lens.

4. An optical component including the interference filter according to claim 3, wherein
the ferrules are made of a transparent glass.

* * * * *